US010959225B2

(12) United States Patent
Yu et al.

(10) Patent No.: US 10,959,225 B2
(45) Date of Patent: Mar. 23, 2021

(54) TECHNIQUES FOR HANDLING SEMI-PERSISTENT SCHEDULING COLLISIONS FOR WIRELESS NETWORKS

(71) Applicant: NOKIA TECHNOLOGIES OY, Espoo (FI)

(72) Inventors: Ling Yu, Kauniainen (FI); Vinh Van Phan, Oulu (FI); Jedrzej Stanczak, Poznan (PL); Hai Tao Li, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/613,034

(22) PCT Filed: Apr. 11, 2018

(86) PCT No.: PCT/EP2018/059271
§ 371 (c)(1),
(2) Date: Nov. 12, 2019

(87) PCT Pub. No.: WO2018/210493
PCT Pub. Date: Nov. 22, 2018

(65) Prior Publication Data
US 2020/0163083 A1 May 21, 2020

Related U.S. Application Data

(60) Provisional application No. 62/506,982, filed on May 16, 2017.

(51) Int. Cl.
H04W 72/04 (2009.01)
H04W 72/08 (2009.01)
H04W 72/10 (2009.01)

(52) U.S. Cl.
CPC ....... H04W 72/0446 (2013.01); H04W 72/08 (2013.01); H04W 72/10 (2013.01)

(58) Field of Classification Search
CPC .. H04W 72/0446; H04W 72/08; H04W 72/10
(Continued)

(56) References Cited

U.S. PATENT DOCUMENTS

2010/0067505 A1* 3/2010 Fein ................ H04B 7/0617
370/338
2013/0083722 A1* 4/2013 Bhargava .......... H04W 52/0209
370/315

(Continued)

FOREIGN PATENT DOCUMENTS

WO 2013169173 A1 11/2013
WO 2018031816 A1 2/2018

OTHER PUBLICATIONS

International Search Report and Written Opinion for International Application No. PCT/EP2018/059271, dated Oct. 11, 2018, 19 pages.

(Continued)

Primary Examiner — Nghi H Ly
(74) Attorney, Agent, or Firm — Brake Hughes Bellermann LLP

(57) ABSTRACT

A technique includes receiving, by a user device, a plurality of semi-persistent scheduling (SPS) configurations, each SPS configuration including an SPS identifier and an interval for each of the plurality of SPS configurations; receiving, by the user device, an SPS activation corresponding to each of the plurality of SPS configurations, each SPS activation indicating a set of resources and a modulation and coding scheme (MCS) to be used for transmission of data for the corresponding SPS configuration; determining, by the user device, that a collision will occur for the plurality of SPS configurations during a transmission time interval (TTI); selecting a MCS corresponding to one of the plurality of SPS configurations that have been determined to collide during the TTI; and transmitting, by the user device during the TTI, (Continued)

data using the selected MCS via an aggregated set of SPS resources that includes at least a portion of each of the sets of resources for the plurality of SPS configurations that have been determined to collide during the TTI.

22 Claims, 4 Drawing Sheets

(58) Field of Classification Search
USPC .......................................... 370/329, 328, 338
See application file for complete search history.

(56) References Cited

U.S. PATENT DOCUMENTS

| | | | | |
|---|---|---|---|---|
| 2013/0163537 A1* | 6/2013 | Anderson | ......... | H04W 72/1284 370/329 |
| 2015/0146677 A1* | 5/2015 | Ito | ........................... | H04W 4/70 370/329 |

OTHER PUBLICATIONS

3GPP TSG-RAN WG2 #98; TDdoc R2-1705539; "Handling Collisions Between Multiple SPS Configurations"; Hangzhou, China; May 15-19, 2017; 2 pages.

3GPP TSG-RAN2 Meeting #96; R2-167481; "Discussion on Remain Issues of V2X SPS Enhancements"; Reno, NV, USA; Nov. 14-18, 2016; 3 pages.

3GPP TSG-RAN WG2 #97bis; R2-1703349; "Support of Multiple UL SPS Configurations for Non-V2X"; Spokane, WA, USA; Apr. 3-7, 2017; 2 pages.

3GPP TSG-RAN WG2 Meeting #98; R2-1705528; "Corrections to Multiple SPS Collisions Handling"; Hangzhou, China; May 15-19, 2017; 2 pages.

3GPP TSG-RAN WG2 Meeting #99; R2-1708592; "Multiple UL SPS Configuration Collision Handling"; Berlin, Germany; Aug. 21-25, 2017; 3 pages.

* cited by examiner

TECHNIQUES FOR HANDLING SEMI-PERSISTENT SCHEDULING COLLISIONS FOR WIRELESS NETWORKS

CROSS-REFERENCE TO RELATED APPLICATIONS

This application is a national stage entry of International Application No. PCT/EP2018/059271, filed Apr. 11, 2018, entitled "TECHNIQUES FOR HANDLING SEMI-PERSISTENT SCHEDULING COLLISIONS FOR WIRELESS NETWORKS" which claims the benefit of priority of U.S. Provisional Application No. 62/506,982, filed May 16, 2017, both of which are hereby incorporated by reference in their entireties.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the Long Term Evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. A goal of 5G is to provide significant improvement in wireless performance, which may include new levels of data rate, latency, reliability, and security. 5G NR may also scale to efficiently connect the massive Internet of Things (IoT), and may offer new types of mission-critical services.

Some types of applications, such as voice (e.g., voice over LTE), may use periodic resources to transmit data (e.g., the application may transmit data via uplink resources every so often, such as every 20 ms or other period. For example, for such applications that may need regularly scheduled resources, rather than requiring a user device/UE to request uplink resources for each transmission/instance, the eNB/BS may use semi-persistent scheduling (SPS) to allocate resources at a specific interval, e.g., to allocate uplink resources every 20 ms (every 20 TTIs), as an example. In this manner, a eNB/BS may use semi-persistent scheduling to schedule resources to a user device/UE at a particular interval or period, while decreasing signaling overhead.

SUMMARY

According to an example implementation, a method includes receiving, by a user device, a plurality of semi-persistent scheduling (SPS) configurations, each SPS configuration including an SPS identifier and an interval for each of the plurality of SPS configurations; receiving, by the user device, an SPS activation corresponding to each of the plurality of SPS configurations, each SPS activation indicating a set of resources and a modulation and coding scheme (MCS) to be used for transmission of data for the corresponding SPS configuration; determining, by the user device, that a collision will occur for the plurality of SPS configurations during a transmission time interval (TTI); selecting a MCS corresponding to one of the plurality of SPS configurations that have been determined to collide during the TTI; and transmitting, by the user device during the TTI, data using the selected MCS via an aggregated set of SPS resources that includes at least a portion of each of the sets of resources for the plurality of SPS configurations that have been determined to collide during the TTI.

According to an example implementation, an apparatus includes at least one processor and at least one memory including computer instructions, when executed by the at least one processor, cause the apparatus to: receive, by a user device, a plurality of semi-persistent scheduling (SPS) configurations, each SPS configuration including an SPS identifier and an interval for each of the plurality of SPS configurations; receive, by the user device, an SPS activation corresponding to each of the plurality of SPS configurations, each SPS activation indicating a set of resources and a modulation and coding scheme (MCS) to be used for transmission of data for the corresponding SPS configuration; determine, by the user device, that a collision will occur for the plurality of SPS configurations during a transmission time interval (TTI); select a MCS corresponding to one of the plurality of SPS configurations that have been determined to collide during the TTI; and transmit, by the user device during the TTI, data using the selected MCS via an aggregated set of SPS resources that includes at least a portion of each of the sets of resources for the plurality of SPS configurations that have been determined to collide during the TTI.

According to an example implementation, an apparatus includes means for receiving, by a user device, a plurality of semi-persistent scheduling (SPS) configurations, each SPS configuration including an SPS identifier and an interval for each of the plurality of SPS configurations; means for receiving, by the user device, an SPS activation corresponding to each of the plurality of SPS configurations, each SPS activation indicating a set of resources and a modulation and coding scheme (MCS) to be used for transmission of data for the corresponding SPS configuration; means for determining, by the user device, that a collision will occur for the plurality of SPS configurations during a transmission time interval (TTI); means for selecting a MCS corresponding to one of the plurality of SPS configurations that have been determined to collide during the TTI; and means for transmitting, by the user device during the TTI, data using the selected MCS via an aggregated set of SPS resources that includes at least a portion of each of the sets of resources for the plurality of SPS configurations that have been determined to collide during the TTI.

According to an example implementation, a computer program product includes a computer-readable storage medium and storing executable code that, when executed by at least one data processing apparatus, is configured to cause the at least one data processing apparatus to perform a method including: receiving, by a user device, a plurality of semi-persistent scheduling (SPS) configurations, each SPS configuration including an SPS identifier and an interval for each of the plurality of SPS configurations; receiving, by the user device, an SPS activation corresponding to each of the plurality of SPS configurations, each SPS activation indicating a set of resources and a modulation and coding scheme (MCS) to be used for transmission of data for the corresponding SPS configuration; determining, by the user device, that a collision will occur for the plurality of SPS configurations during a transmission time interval (TTI); selecting a MCS corresponding to one of the plurality of SPS configurations that have been determined to collide during the TTI; and transmitting, by the user device during the TTI, data using the selected MCS via an aggregated set of SPS resources that includes at least a portion of each of the sets of resources for the plurality of SPS configurations that have been determined to collide during the TTI.

The details of one or more examples of implementations are set forth in the accompanying drawings and the description below. Other features will be apparent from the description and drawings, and from the claims.

DETAILED DESCRIPTION

Figure 1:
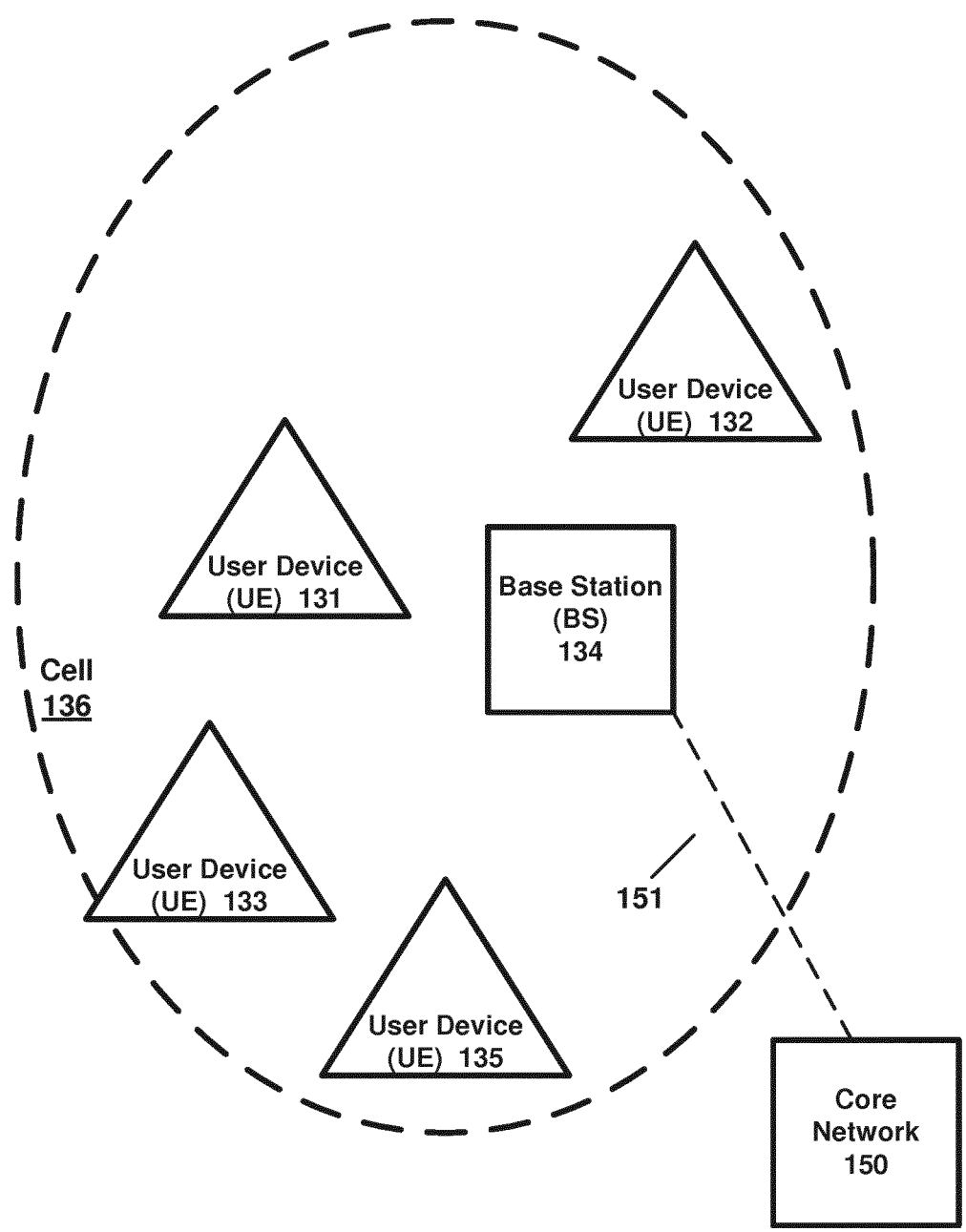
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB, or a network node. At least part of the functionalities of an access point (AP), base station (BS) or (e)Node B (eNB) may be also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE) or mobile station) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example implementations or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC).

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability, for example, corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability)

The various example implementations may be applied to a wide variety of wireless technologies or wireless networks, such as LTE, LTE-A, 5G, cmWave, and/or mmWave band networks, IoT, MTC, eMTC, eMBB, URLLC, V2X (vehicle-to-vehicle, or vehicle-to-infrastructure), etc., or any other wireless network or wireless technology. These example networks, technologies or data service types are provided only as illustrative examples.

As noted, different data service types (or different types of UEs and/or different applications running on a UE/user device) may have different performance requirements, such as for reliability (e.g., maximum block error rate), bandwidth or data throughput or minimum data rate, and/or latency.

For example, as noted, some types of applications, such as voice (e.g., voice over LTE) or other applications or services, may use periodic resources to transmit or receive data (e.g., transmit data periodically, such as, for example, every 5 ms, every 10 ms, every 20 ms, or other period). For example, such applications may need or may use regular or periodic resources. To efficiently schedule such resources and/or decrease signaling overhead, the eNB/BS may use semi-persistent scheduling (SPS) to allocate resources at a specific interval or period, e.g., to allocate uplink resources every 20 ms (every 20 TTIs), as an example. Thus, for example, the use of SPS may decrease downlink assignments and/or uplink grants for a UE/user device.

According to an example implementation, a UE may receive a SPS configuration (also may be referred to as an SPS pre-configuration), e.g., as a radio resource control (RRC) message. The SPS configuration may include, for example, an SPS identifier and an interval (or period) for the semi-persistent scheduling (SPS) resource. The interval (or period) may indicate the interval or period of time between the scheduled resources, e.g., 5 transmission time intervals (TTIs)/subframes, 10 TTIs/subframes, 14 TTIs/subframes, 20 TTIs/subframes, etc. According to an example implementation, the SPS identifier may include a semi-persistent scheduling-radio network temporary identifier (SPS-RNTI) to identify one or more (or all) SPS data that may be transmitted downlink to the UE (or may be associated with one or more or all SPS configurations for a UE), for example. A UE may be allocated SPS resources for a plurality of SPS configurations (e.g., for different applications or services). Each SPS configuration may be identified by (or correspond to) a different SPS configuration index, e.g., SPS configuration indexes 0, 1, 2, 3 . . . , to identify a different SPS configuration. The SPS identifier may also include a SPS configuration index.

According to an example implementation, a UE may request uplink (for example) resources, e.g., by sending a buffer status report to the eNB/BS (which may indicate uplink data at the UE for transmission (e.g., which may indicate periodic data or data corresponding to an application that may use or require periodic resources, or resources over a period of time), or by sending an uplink grant request.

According to an example implementation, e.g., after receiving a request for uplink resources from a UE, an eNB/BS may activate one or more of the configured SPS configurations, e.g., by sending an SPS activation corresponding to each of one or more of the SPS configurations. According to an example implementation, an SPS activation (sent by a eNB/BS and received by a UE) may include or may identify/indicate, for example, a modulation and coding scheme (modulation scheme and coding rate) or MCS to be used for the uplink transmission of data for the SPS configuration, and a set of resources to be used for such uplink transmission of the data for the SPS configuration. The indication or identification of a set of resources within a SPS activation may indicate a set of physical resource blocks (PRBs), e.g., where each PRB may include a set or group of time/frequency resource(s), such as one or more OFDM (orthogonal frequency division multiplexing) or OFDMA (orthogonal frequency division multiple access) symbols, by way of example. Thus, in the case of the activation of multiple SPS configurations for a UE, the eNB/BS may send an SPS activation for all the SPS configurations, or an SPS activation for each SPS configuration, to indicate a MCS and a set of resources (SPS resources) to be used by the UE/user device to transmit data via the set of SPS resources.

Furthermore, according to an illustrative example implementation, a UE/user device may include one or more applications or services that may require or benefit from SPS resources scheduled at a particular interval or period. Thus, as noted, a UE may be configured for multiple SPS configurations, e.g., a different SPS configuration for each different application or service that may be running on the UE/user device, as an illustrative example. And, as noted, each of these multiple SPS configurations may be activated for a UE. Each of the multiple activated SPS configurations may include, for example, a different MCS, and/or a different interval or period. In some cases, e.g., based on different starting TTIs for each SPS configuration, and/or depending on different intervals/periods for the plurality of activated SPS configurations, a UE may be scheduled for the transmission of data for multiple SPS configurations within a TTI (e.g., within subframe). A UE/user device may generate a transport block for transmission during a TTI that may include data from multiple activated SPS configurations. However, a problem may arise, at least in some cases, based on a mismatch in MCS for the multiple SPS configurations. According to an example implementation, a UE/user device may be capable of transmitting data during a transport block (within any TTI or subframe, for example) using only one MCS. Thus, in at least some cases, it may not be possible for the UE to divide a transport block (or subframe) into different portions, and apply a different MCS to each portion of the transport block. Thus, as noted, the UE may typically be able to transmit a transport block within one TTI using only one MCS.

According to an example implementation, a SPS collision for a UE may occur when the UE has data scheduled for multiple SPS configurations for a TTI (a same TTI or subframe). The SPS collision may be particularly problematic for a UE where different MCS may be used for each of the SPS configurations that have been determined to collide in a TTI (e.g., a TTI in the future). For example, the multiple SPS configurations, in general, may use different MCS, and the UE may use only one MCS per transport block or subframe or TTI, for example. Therefore, in general, a SPS collision for a UE may create a problem for a UE.

Therefore, various techniques are described that may allow the UE to select a MCS that may be used to transmit data using the aggregated SPS resources (e.g., some or all of the SPS resources allocated for a plurality of activated SPS configurations) within a TTI or subframe. In this manner, the UE may avoid wasting one or more SPS resources. According to an example implementation, the UE may transmit, based on a selected MCS during the TTI (the TTI during which an SPS collision is determined/expected), SPS data for each SPS configuration of the plurality of SPS configurations via the set of resources corresponding to the SPS configuration. Thus, for example, if resource set 1 is allocated for SPS configuration 1, and resource set 2 is allocated for SPS configuration 2, the aggregated set of SPS resources may include resource set 1 and resource set 2, and the UE may transmit (using the selected MCS) the data for SPS configuration 1 via resource set 1 and may send/transmit the data for SPS configuration 2 via resource set 2 (where both of these transmission are transmitted via the selected MCS). In a different example implementation, the UE may, e.g., prioritize the SPS configurations (such as based on a QoS parameter or other criteria), and then may prioritize or transmit in priority order (beginning with the transmission of the highest priority SPS configuration) data for each of the SPS configurations using the aggregated set of SPS resources. Thus, in the event that SPS configuration 2 is prioritized over SPS configuration 1, all the data in data buffers at the UE for SPS configuration 2 may be transmitted first via resource set 1 and resource set 2 (if necessary), and any remaining resources (of the aggregated SPS resources, including SPS resource sets 1, 2) may be used to transmit the data for the lower priority SPS configuration 1, for example.

Various criteria may be used by the UE to select a MCS among the MCS of the plurality of SPS configurations that are determined to collide during a TTI. For example, an MCS may be selected having a specific SPS configuration index (e.g., select the MCS of the SPS configuration having a lowest or a highest SPS configuration index, among the plurality of SPS configurations that are determined to collide during the TTI. Also, for example, each SPS configuration may be associated with a radio bearer, and each bearer may be associated with a Quality of Service (QoS) and/or one or more QoS parameters. In this manner, for example, there may be a QoS or QoS parameter that may be associated with or corresponding to each SPS configuration. Thus, a MCS associated with or corresponding to one of the SPS configurations, out of the plurality of SPS configurations determined to collide in a TTI, may be selected based on a QoS parameter, e.g., such as, a priority, a minimum data rate, a packet delay budget, and a packet error loss rate, associated with each of the SPS configurations. For example, a MCS may be selected for the SPS configuration that has, e.g., a highest priority, a highest bit rate, a lowest packet error loss rate, a lowest packet delay budget, among the plurality of SPS configurations determined to collide. Or, a MCS may be selected that is the most robust (e.g., lowest MCS) or the least robust (e.g., highest MCS), among the plurality of SPS configurations that are determined to collide.

Or, more generally, a UE may select a MCS, among the MCS for each SPS configuration of the plurality of SPS configurations determined to collide, based on a rule or a set of rules. Example rule(s) are described hereinabove (e.g., based on SPS configuration index, QoS parameter, based on most or least robust MCS, . . . or other rule or criteria). Also, for example, the rule or criteria for selecting one of the MCSs where there is a SPS collision may be based on (or indicated by) an instruction received from the eNB/BS, or defined in advance (e.g., indicated by a standard or specification) and known by the UE, for example.

According to an example implementation, various example implementations are described relating to a network configuration and UE behavior in case of an SPS collision among a plurality of SPS configurations for a UE. These example techniques may include one or more advantages or benefits, such as, for example, at least in some cases:

i) signaling overhead may be reduced, and/or a more efficient use of resources may be provided;

ii) the network/BS may become aware of the UE actions when a collision is determined/identified, e.g., based on a rule or set of rules that the UE may apply to select a MCS and then use aggregated SPS resources to transmit SPS data for one or more (or all) of the plurality of SPS configurations during the TTI;

ii) the UE uses the activated SPS resource allocations (aggregated SPS resources among the plurality of colliding SPS configurations) to transmit UL data as much as possible without wasting the allocated resources unnecessarily; and/or iii) the network/BS may avoid triggering a dynamic scheduling unnecessarily, e.g., where the BS might need to reschedule a resource of the SPS resources to avoid wasting or non-use of the resources in the case of a SPS collision (in at least some cases, various example implementations may, at least in some cases, avoid the need for the BS to send another dynamic scheduling of resources based on the determined collision, because the network/BS may know that the UE will select a MCS and then transmit some SPS data via at least a portion or even all of the aggregated SPS resources, for example).

The network may configure the UE on determination rules of the MCS to form the transport block if a collision of multiple SPS allocations is determined or detected, e.g., for a future TTI. For instance, a UE may be configured to use the least or most robust MCS in the activated SPS allocations. Or, UE may be configured to use the MCS of the SPS allocation with a specific SPS configuration index, e.g., SPS-Config-index (e.g., the lowest or highest index). UE may be configured to automatically select the SPS configuration with the: highest bit rate, highest reliability requirement, highest or lowest QoS requirement.

Upon detecting an SPS collision (e.g., involving multiple SPS configurations schedule for transmission during a TTI), the UE uses aggregated PRBs (physical resource blocks) in all the active SPS allocation in the given TTI and configured MCS based on network configuration to form the transport block by taking into account all the available data of the PRBs associated to the SPS configurations/allocations. For example, aggregated PRBs may include, by way of illustrative example: 10 resources for SPS configuration index 1, 8 PRBs allocated for SPS configuration index 2, and 5 PRBs allocated for SPS configuration index 3, giving a total of 23 PRBs for an example aggregated set of SPS resources (e.g., which may be used to transmit SPS data from one or more of these activated SPS configurations) based on a selection of one MCS to be used for the TTI. According to an example implementation, in the event that there is an overlap in frequency among PRBs of different SPS configurations, this may decrease the amount of PRBs in the aggregated set of SPS resources (e.g., if two PRBs overlap, this may reduce aggregate set of PRBs by 1 PRB, in an illustrative example).

Figure 2:
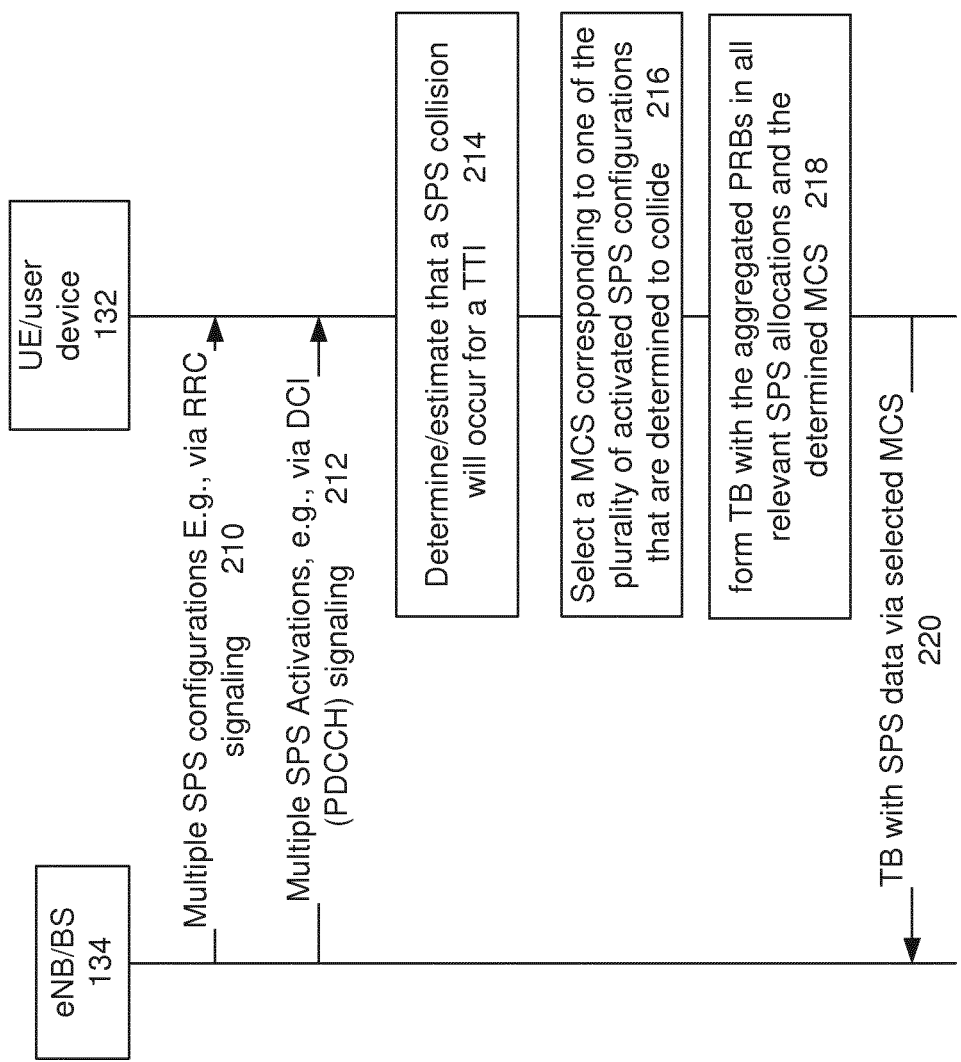
FIG. 2 is a diagram illustrating operation of a network according to an example implementation.

FIG. 2 is a diagram illustrating operation of a network according to an example implementation. At 210, a UE/user device 132 may receive multiple SPS configurations, e.g., via RRC signaling (these multiple SPS configurations may be received via one or more RRC messages). At 212, the UE/user device 132 may receive multiple SPS activations, e.g., via DCI (downlink control information) and PDCCH (physical downlink control channel) signaling/messages. Each SPS activation received at 212 may include (or may indicate or identify), for example, a set of SPS resources (e.g., PRBs) and a MCS for a corresponding SPS configuration of the plurality of activated SPS configurations. At 214, the UE (and the BS) may determine that a SPS collision will occur for a TTI for a plurality of the activated SPS configurations for the UE, for example. For example, the UE may determine that, based on the period for each of the plurality of SPS configurations, two or more of the activated SPS configurations will be scheduled for uplink transmission during a same TTI. At 216, the UE may select a MCS corresponding to an SPS configuration of the plurality of activated SPS configurations determined to collide. At 218, the UE may form or generate a transport block (e.g., including SPS data for one or more or all of the plurality of SPS configurations determined to collide), based on the selected MCS, for transmission during the TTI via the aggregated set of SPS resources. At 220, the UE/user device 132 may transmit the transport block to the eNB/BS 134 via the selected MCS and the aggregated set of SPS resources.

According to an example implementation, MCS for each SPS configuration may be indicated in DCI/PDCCH; but, in event of a SPS collision at UE, the UE would select an MCS for the TB for that TTI where there is a SPS collision; UE may then form the TB (transport block) using the selected MCS to transmit the TB, including the SPS data, via aggregated PRBs.

In the event of a determined SPS collision, some example techniques that may be used to select an MCS may include, for example:

1) a most robust MCS may be selected among colliding SPS configurations;

2) a selection by UE of a MCS according to a rule (e.g., known in advanced by UE via specification), where aggregated PRBs (aggregate SPS resources) may be used to transmit data (for all or some of the SPS configurations); and 3) UE selects MCS for one of the SPS configurations—based on one or more QoS parameters (e.g., priority) for each SPS configuration of radio bearer; e.g., SPS may be associated with a radio bearer, and the radio bearer has a QoS. So in this manner, each SPS configuration has an associated QoS, so UE may select a MCS for the SPS having a highest/lowest QoS parameter.

Example 1

Figure 3:
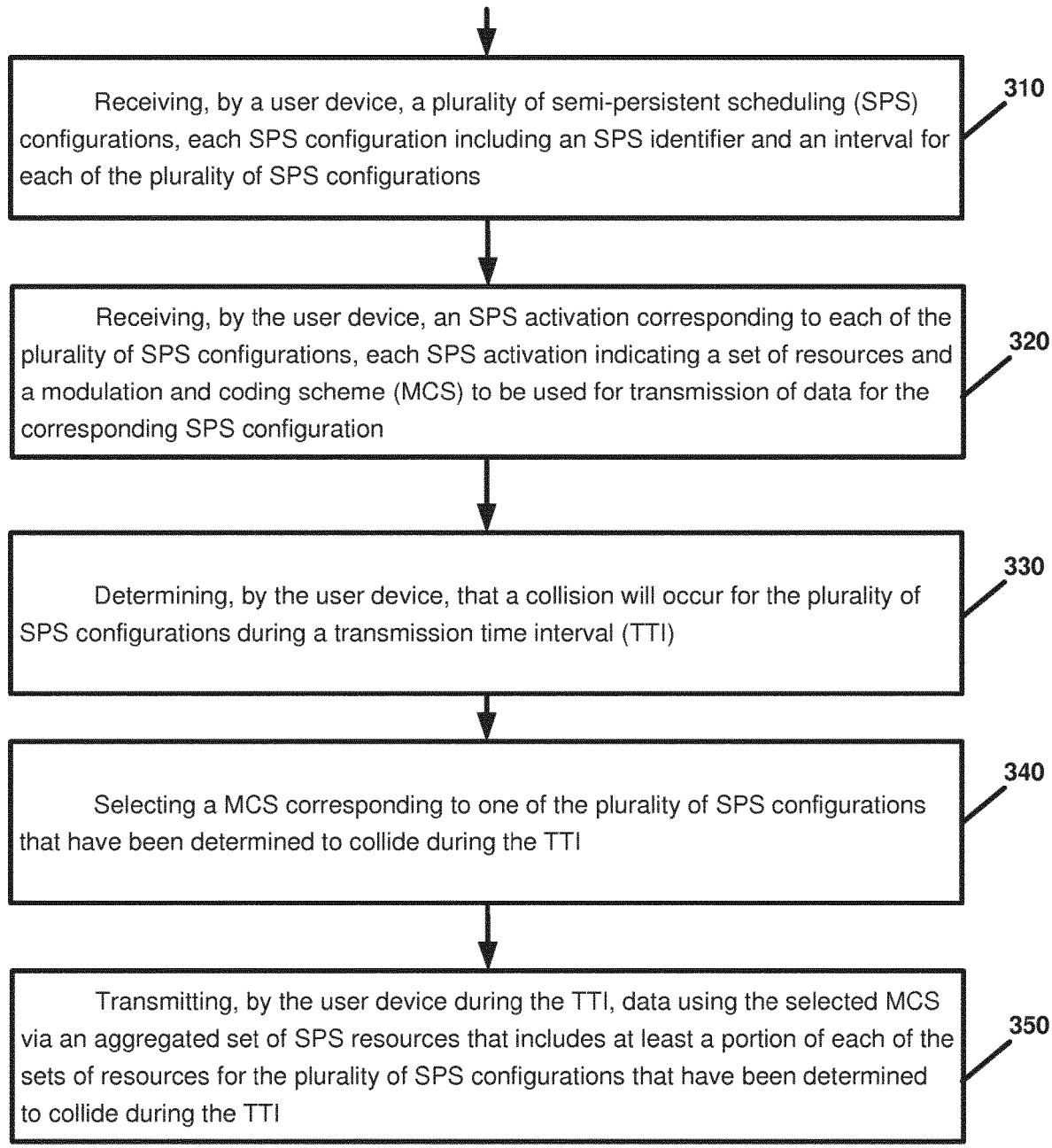
FIG. 3 is a flow chart illustrating operation of a user device according to an example implementation.

FIG. 3 is a flow chart illustrating operation of a user device according to an example implementation. Operation 310 includes receiving, by a user device, a plurality of semi-persistent scheduling (SPS) configurations, each SPS configuration including an SPS identifier and an interval for each of the plurality of SPS configurations; Operation 320 includes receiving, by the user device, an SPS activation corresponding to each of the plurality of SPS configurations, each SPS activation indicating a set of resources and a modulation and coding scheme (MCS) to be used for transmission of data for the corresponding SPS configuration; operation 330 includes determining, by the user device, that a collision will occur for the plurality of SPS configurations during a transmission time interval (TTI); Operation 340 includes selecting a MCS corresponding to one of the plurality of SPS configurations that have been determined to collide during the TTI; and Operation 350 includes transmitting, by the user device during the TTI, data using the selected MCS via an aggregated set of SPS resources that includes at least a portion of each of the sets of resources for the plurality of SPS configurations that have been determined to collide during the TTI.

Example 2

According to an example implementation of the method of example 1, wherein the SPS identifier for a SPS configuration comprises at least one of a SPS radio network temporary identifier (SPS-RNTI) and a SPS configuration index.

Example 3

According to an example implementation of the method of any of examples 1-2, wherein the selecting a MCS corresponding to one of the plurality of SPS configurations that have been determined to collide during the TTI comprises: selecting, by the user device, an MCS of one of the SPS configurations of the plurality of SPS configurations that have been determined to collide during the TTI, based on a Quality of Service (QoS) parameter, including one or more of a priority, minimum data rate, packet delay budget, packet error loss rate, associated with each of the SPS configurations.

Example 4

According to an example implementation of the method of any of examples 1-3, wherein the selecting a MCS corresponding to one of the plurality of SPS configurations that have been determined to collide during the TTI comprises: selecting, by the user device, an MCS of the SPS configuration of the plurality of SPS configurations having a most robust MCS (e.g., lowest MCS).

Example 5

According to an example implementation of the method of any of examples 1-4, wherein the selecting a MCS corresponding to one of the plurality of SPS configurations that have been determined to collide during the TTI comprises: selecting, by the user device, an MCS of the SPS configuration of the plurality of SPS configurations having a least robust MCS (e.g., highest MCS).

Example 6

According to an example implementation of the method of any of examples 1-5, wherein the selecting a MCS corresponding to one of the plurality of SPS configurations that have been determined to collide during the TTI comprises: selecting, by the user device, an MCS according to a rule or set of rules known by the user device.

Example 7

According to an example implementation of the method of any of examples 1-6, wherein the transmitting comprises: transmitting, based on the selected MCS during the TTI, data for each SPS configuration of the plurality of SPS configurations via the set of resources corresponding to the SPS configuration.

Example 8

According to an example implementation of the method of any of examples 1-7, wherein the transmitting comprises: transmitting, based on the selected MCS during the TTI, data for one SPS configuration of the plurality of SPS configurations via the aggregated set of SPS resources that includes at least a portion of each of the sets of resources for the plurality of SPS configurations.

Example 9

According to an example implementation of the method of any of examples 1-8, wherein the transmitting comprises: determining a priority order of the plurality of SPS configurations; and transmitting, based on the selected MCS during the TTI, data for as many SPS configurations of the plurality of SPS configurations as possible according to the priority order of corresponding SPS configurations via the aggregated set of SPS resources that includes at least a portion of each of the sets of resources for the plurality of SPS configurations.

Example 10

According to an example implementation of the method of any of examples 1-9, wherein the transmitting comprises transmitting, in a decreasing order of priority, data packets which need to be transmitted during the TTI corresponding to the SPS configurations.

Example 11

According to an example implementation of the method of any of examples 1-10, wherein the priority order is determined based on a SPS configuration index for each SPS configuration of the plurality of SPS configurations.

Example 12

According to an example implementation of the method of any of examples 1-11, wherein the priority order is determined based on a priority for each SPS configuration of the plurality of SPS configurations.

Example 13

According to an example implementation of the method of any of examples 1-12, wherein the priority order is determined based on a Quality of Service (QoS) parameter for each SPS configuration of the plurality of SPS configurations, wherein the QoS parameter includes one or more of the following QoS parameters: a priority, a minimum data rate, a packet delay budget, and a packet error loss rate, associated with each of the SPS configurations.

Example 14

According to an example implementation, an apparatus includes means for performing the method any of examples 1-13.

Example 15

According to an example implementation, an apparatus includes at least one processor and at least one memory including computer instructions, when executed by the at least one processor, cause the apparatus to perform the method of any of examples 1-13.

Figure 4:
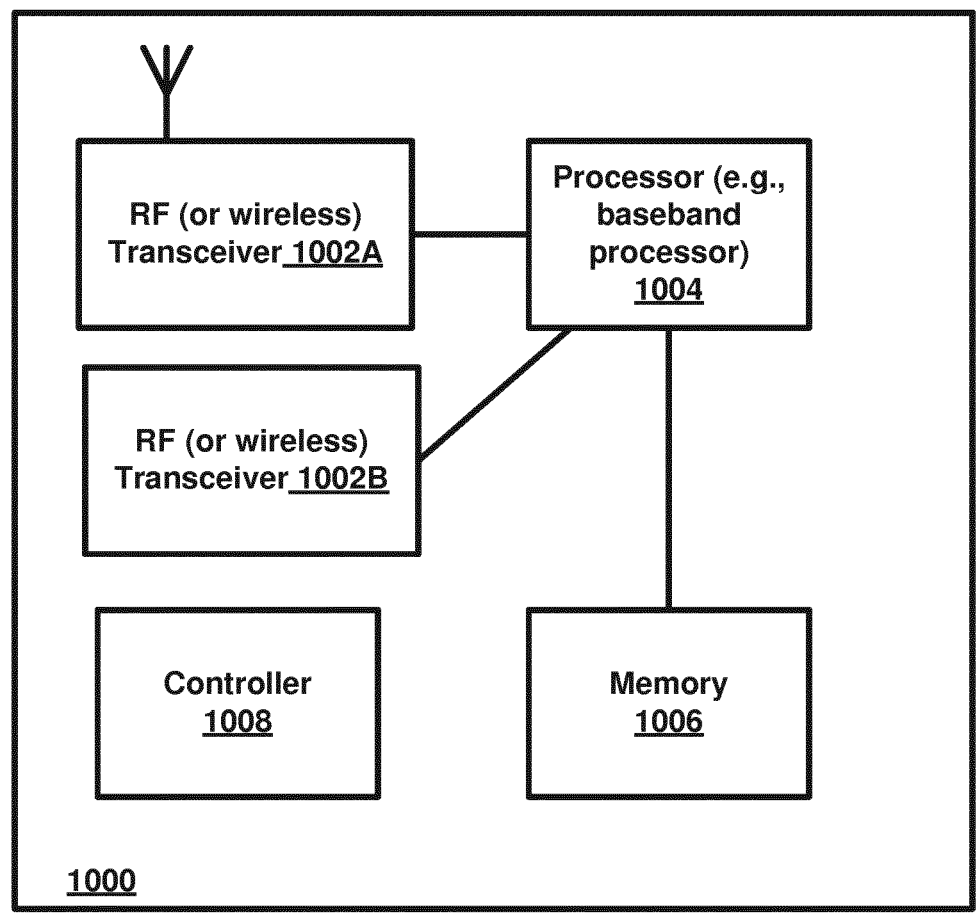
FIG. 4 is a block diagram of a node or wireless station (e.g., base station/access point or mobile station/user device) according to an example implementation.

FIG. 4 is a block diagram of a wireless station (e.g., AP, BS, eNB, UE or user device, or other network device) 1000 according to an example implementation. The wireless station 1000 may include, for example, one or two RF (radio frequency) or wireless transceivers 1002A, 1002B, where each wireless transceiver includes a transmitter to transmit signals and a receiver to receive signals. The wireless station also includes a processor or control unit/entity (controller) 1004 to execute instructions or software and control transmission and receptions of signals, and a memory 1006 to store data and/or instructions.

Processor 1004 may also make decisions or determinations, generate frames, packets or messages for transmission, decode received frames or messages for further processing, and other tasks or functions described herein. Processor 1004, which may be a baseband processor, for example, may generate messages, packets, frames or other signals for transmission via wireless transceiver 1002 (1002A or 1002B). Processor 1004 may control transmission of signals or messages over a wireless network, and may control the reception of signals or messages, etc., via a wireless network (e.g., after being down-converted by wireless transceiver 1002, for example). Processor 1004 may be programmable and capable of executing software or other instructions stored in memory or on other computer media to perform the various tasks and functions described above, such as one or more of the tasks or methods described above. Processor 1004 may be (or may include), for example, hardware, programmable logic, a programmable processor that executes software or firmware, and/or any combination of these. Using other terminology, processor 1004 and transceiver 1002 together may be considered as a wireless transmitter/receiver system, for example.

In addition, referring to FIG. 4, a controller (or processor) 1008 may execute software and instructions, and may provide overall control for the station 1000, and may provide control for other systems not shown in FIG. 4, such as controlling input/output devices (e.g., display, keypad), and/or may execute software for one or more applications that may be provided on wireless station 1000, such as, for example, an email program, audio/video applications, a word processor, a Voice over IP application, or other application or software.

In addition, a storage medium may be provided that includes stored instructions, which when executed by a controller or processor may result in the processor 1004, or other controller or processor, performing one or more of the functions or tasks described above.

According to another example implementation, RF or wireless transceiver(s) 1002A/1002B may receive signals or data and/or transmit or send signals or data. Processor 1004 (and possibly transceivers 1002A/1002B) may control the RF or wireless transceiver 1002A or 1002B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

The invention claimed is:

1. A method comprising:
receiving, by a user device, a plurality of semi-persistent scheduling (SPS) configurations, each SPS configuration including an SPS identifier and an interval for each of the plurality of SPS configurations;
receiving, by the user device, an SPS activation corresponding to each of the plurality of SPS configurations, each SPS activation indicating a set of resources and a modulation and coding scheme (MCS) to be used for transmission of data for the corresponding SPS configuration;
determining, by the user device, that a collision will occur for the plurality of SPS configurations during a transmission time interval (TTI);
selecting a MCS corresponding to one of the plurality of SPS configurations that have been determined to collide during the TTI; and
transmitting, by the user device during the TTI, data using the selected MCS via an aggregated set of SPS resources that includes at least a portion of each of the sets of resources for the plurality of SPS configurations that have been determined to collide during the TTI.

2. The method of claim 1 wherein the SPS identifier for a SPS configuration comprises at least one of a SPS radio network temporary identifier (SPS-RNTI) and a SPS configuration index.

3. The method of claim 1 wherein the selecting a MCS corresponding to one of the plurality of SPS configurations that have been determined to collide during the TTI comprises:

selecting, by the user device, an MCS of one of the SPS configurations of the plurality of SPS configurations that have been determined to collide during the TTI, based on a Quality of Service (QoS) parameter, including one or more of a priority, minimum data rate, packet delay budget, packet error loss rate, associated with each of the SPS configurations.

4. The method of claim 1 wherein the selecting a MCS corresponding to one of the plurality of SPS configurations that have been determined to collide during the TTI comprises:
   selecting, by the user device, an MCS of the SPS configuration of the plurality of SPS configurations having a most robust MCS.

5. The method of claim 1 wherein the selecting a MCS corresponding to one of the plurality of SPS configurations that have been determined to collide during the TTI comprises:
   selecting, by the user device, an MCS of the SPS configuration of the plurality of SPS configurations having a least robust MCS.

6. The method of claim 1 wherein the selecting a MCS corresponding to one of the plurality of SPS configurations that have been determined to collide during the TTI comprises:
   selecting, by the user device, an MCS according to a rule or set of rules known by the user device.

7. The method of claim 1 wherein the transmitting comprises:
   transmitting, based on the selected MCS during the TTI, data for each SPS configuration of the plurality of SPS configurations via the set of resources corresponding to the SPS configuration.

8. The method of claim 1 wherein the transmitting comprises:
   transmitting, based on the selected MCS during the TTI, data for one SPS configuration of the plurality of SPS configurations via the aggregated set of SPS resources that includes at least a portion of each of the sets of resources for the plurality of SPS configurations.

9. The method of claim 1 wherein the transmitting comprises:
   determining a priority order of the plurality of SPS configurations;
   transmitting, based on the selected MCS during the TTI, data for as many SPS configurations of the plurality of SPS configurations as possible according to the priority order of corresponding SPS configurations via the aggregated set of SPS resources that includes at least a portion of each of the sets of resources for the plurality of SPS configurations.

10. The method of claim 9 wherein the transmitting comprises transmitting, in a decreasing order of priority, data packets which need to be transmitted during the TTI corresponding to the SPS configurations.

11. The method of claim 9 wherein the priority order is determined based on a SPS configuration index for each SPS configuration of the plurality of SPS configurations.

12. The method of claim 9 wherein the priority order is determined based on a priority for each SPS configuration of the plurality of SPS configurations.

13. The method of claim 9 wherein the priority order is determined based on a Quality of Service (QoS) parameter for each SPS configuration of the plurality of SPS configurations, wherein the QoS parameter includes one or more of the following QoS parameters: a priority, a minimum data rate, a packet delay budget, and a packet error loss rate, associated with each of the SPS configurations.

14. An apparatus comprising at least one processor and at least one memory including computer instructions, the at least one memory and computer instructions configured, with the at least one processor, to cause the apparatus to:
   receive, by a user device, a plurality of semi-persistent scheduling (SPS) configurations, each SPS configuration including an SPS identifier and an interval for each of the plurality of SPS configurations;
   receive, by the user device, an SPS activation corresponding to each of the plurality of SPS configurations, each SPS activation indicating a set of resources and a modulation and coding scheme (MCS) to be used for transmission of data for the corresponding SPS configuration;
   determine, by the user device, that a collision will occur for the plurality of SPS configurations during a transmission time interval (TTI);
   select a MCS corresponding to one of the plurality of SPS configurations that have been determined to collide during the TTI; and
   transmit, by the user device during the TTI, data using the selected MCS via an aggregated set of SPS resources that includes at least a portion of each of the sets of resources for the plurality of SPS configurations that have been determined to collide during the TTI.

15. The apparatus of claim 14 wherein the SPS identifier for a SPS configuration comprises at least one of a SPS radio network temporary identifier (SPS-RNTI) and a SPS configuration index.

16. The apparatus of claim 14 wherein the at least one memory and computer instructions configured, with the at least one processor, to cause the apparatus to select a MCS corresponding to one of the plurality of SPS configurations that have been determined to collide during the TTI comprises the at least one memory and computer instructions configured, with the at least one processor, to cause the apparatus to:
   select, by the user device, an MCS of one of the SPS configurations of the plurality of SPS configurations that have been determined to collide during the TTI, based on a Quality of Service (QoS) parameter, including one or more of a priority, minimum data rate, packet delay budget, packet error loss rate, associated with each of the SPS configurations.

17. The apparatus of claim 14 wherein the at least one memory and computer instructions configured, with the at least one processor, to cause the apparatus to select a MCS corresponding to one of the plurality of SPS configurations that have been determined to collide during the TTI comprises the at least one memory and computer instructions configured, with the at least one processor, to cause the apparatus to:
   select, by the user device, an MCS of the SPS configuration of the plurality of SPS configurations having a most robust MCS.

18. The apparatus of claim 14 wherein the at least one memory and computer instructions configured, with the at least one processor, to cause the apparatus to select a MCS corresponding to one of the plurality of SPS configurations that have been determined to collide during the TTI comprises the at least one memory and computer instructions configured, with the at least one processor, to cause the apparatus to:

select, by the user device, an MCS of the SPS configuration of the plurality of SPS configurations having a least robust MCS.

19. The apparatus of claim 14 wherein the at least one memory and computer instructions configured, with the at least one processor, to cause the apparatus to select a MCS corresponding to one of the plurality of SPS configurations that have been determined to collide during the TTI comprises the at least one memory and computer instructions configured, with the at least one processor, to cause the apparatus to:

select, by the user device, an MCS according to a rule or set of rules known by the user device.

20. The apparatus of claim 14 wherein the at least one memory and computer instructions configured, with the at least one processor, to cause the apparatus to transmit comprises the at least one memory and computer instructions configured, with the at least one processor, to cause the apparatus to:

transmit, based on the selected MCS during the TTI, data for each SPS configuration of the plurality of SPS configurations via the set of resources corresponding to the SPS configuration.

21. The apparatus of claim 14 wherein the at least one memory and computer instructions configured, with the at least one processor, to cause the apparatus to transmit comprises the at least one memory and computer instructions configured, with the at least one processor, to cause the apparatus to:

transmit, based on the selected MCS during the TTI, data for one SPS configuration of the plurality of SPS configurations via the aggregated set of SPS resources that includes at least a portion of each of the sets of resources for the plurality of SPS configurations.

22. The apparatus of claim 14 wherein the at least one memory and computer instructions configured, with the at least one processor, to cause the apparatus to transmit comprises the at least one memory and computer instructions configured, with the at least one processor, to cause the apparatus to:

determine a priority order of the plurality of SPS configurations; and transmit, based on the selected MCS during the TTI, data for as many SPS configurations of the plurality of SPS configurations as possible according to the priority order of corresponding SPS configurations via the aggregated set of SPS resources that includes at least a portion of each of the sets of resources for the plurality of SPS configurations.

\* \* \* \* \*